United States Patent
Hashiba et al.

(10) Patent No.: US 8,844,582 B2
(45) Date of Patent: Sep. 30, 2014

(54) DELIVERY PIPE

(75) Inventors: Hirofumi Hashiba, Chita-gun (JP); Yoji Tsuzuki, Anjo (JP); Hikaru Kikuta, Takahama (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 960 days.

(21) Appl. No.: 12/966,296

(22) Filed: Dec. 13, 2010

(65) Prior Publication Data

US 2011/0186171 A1 Aug. 4, 2011

(30) Foreign Application Priority Data

Jan. 29, 2010 (JP) ................................. 2010-017786

(51) Int. Cl.
*F16L 9/00* (2006.01)

(52) U.S. Cl.
CPC ........................ *F16L 9/00* (2013.01)
USPC ............................ 138/177; 138/178; 123/468

(58) Field of Classification Search
CPC .............. F02M 55/025; F02M 55/04; F02M 2200/857; F02M 69/465; F16L 47/32; F16L 9/00
USPC ............................ 138/177, 178; 123/468, 456
See application file for complete search history.

(56) References Cited

U.S. PATENT DOCUMENTS

| | | | | |
|---|---|---|---|---|
| 5,595,160 A | * | 1/1997 | Matsumoto et al. | 123/456 |
| 5,735,247 A | * | 4/1998 | Tsuzuki et al. | 123/470 |
| 2011/0265766 A1 | * | 11/2011 | Niwa et al. | 123/468 |
| 2011/0283973 A1 | * | 11/2011 | Niwa et al. | 123/468 |

FOREIGN PATENT DOCUMENTS

| | | |
|---|---|---|
| JP | A 8-270523 | 10/1996 |
| JP | A 8-326622 | 12/1996 |
| JP | A-9-144625 | 6/1997 |
| JP | A-9-310662 | 12/1997 |
| JP | A 11-037380 | 2/1999 |
| JP | A-2000-329031 | 11/2000 |
| JP | A 2005-036781 | 2/2005 |
| JP | A-2006-299903 | 11/2006 |
| JP | 2011241754 A * | 12/2011 |

OTHER PUBLICATIONS

Japanese Office Action issued in Japanese Patent Application No. 2010-071186 on Dec. 10, 2013 (with translation).
May 21, 2013 Office Action issued in Japanese Patent Application No. 2010-017786 (with translation).

* cited by examiner

*Primary Examiner* — Patrick F Brinson
(74) *Attorney, Agent, or Firm* — Oliff PLC

(57) ABSTRACT

A delivery pipe is molded of resin and internally formed with a fuel passage. The delivery pipe has a shape of cross section including a single straight part, a single curved part, and joint parts at joints between ends of the straight part and the curved part. The joint part has an outer appearance protruding outward. The resin contains reinforcing glass fibers. A corresponding portion to a resin injection gate is located at an end region of the straight part in a longitudinal direction of the fuel passage.

19 Claims, 16 Drawing Sheets

| BENDING DIRECTION | PARALLEL | PERPENDICULAR |
|---|---|---|
| ELASTICITY COEFFICIENT (MPa) | 10000 | 6480 |
| DEFLECTION RATIO | 1 | 1.54 |

DELIVERY PIPE

CROSS-REFERENCE TO RELATED APPLICATIONS

This application is based upon and claims the benefit of priority from the prior Japanese Patent Application No. 2010-017786 filed on Jan. 29, 2010, the entire contents of which are incorporated herein by reference.

TECHNICAL FIELD

The present invention relates to a delivery pipe for distributing fuel to a plurality of injectors placed in one-to-one correspondence with cylinders of an engine and, more particularly, to a delivery pipe molded of resin.

BACKGROUND ART

Conventionally, a plurality of injectors is attached to a delivery pipe provided in an engine. During operation of the engine, fuel is repeatedly injected from those injectors. At that time, in the delivery pipe, fuel pressure pulsates by injection of each injector and thus different pressure pulsations resonate, or vibrate sympathetically. This may cause larger pulsation and variation of the fuel pressure. When the pulsation of fuel pressure becomes large in this way, a fuel injection amount from each injector may vary due to such large pressure pulsation. The control of air-fuel ratio of the engine becomes unstable, leading to deterioration of engine performance, stop of the engine, and generation of noise.

To restrain the pulsation of fuel pressure in the delivery pipe, accordingly, JP 8(1996)-270523A discloses a metal delivery pipe provided with a pulsation damper. In this case, however, the addition of the pulsation damper results in an increase in size of the delivery pipe and in the number of components.

JP 11(1999)-37380A therefore discloses a delivery pipe capable of reducing the pulsation of fuel pressure without adding a pulsation damper. This delivery pipe is molded of resin to have a capacity of 100 (cm$^3$) or more and a shape of cross section including a straight part and a curved part. When viewed in three dimensions, the straight part forms a flat plate portion extending in a longitudinal direction of the delivery pipe and having flexibility and the curved part forms a curved plate portion extending in the longitudinal direction. This delivery pipe can absorb the pulsation of fuel pressure by use of flexibility of the straight part (the flat plate portion), thereby reducing the pulsation.

SUMMARY OF INVENTION

Technical Problem

However, in the delivery pipe disclosed in JP '380A, when the straight part (the flat plate portion) is deflected or deformed under the influence of fuel pressure, stress concentrates on a portion joining (a joint part) the straight part (the flat plate portion) and the curved part (the curved plate portion). Thus, there is a possibility that the delivery pipe may be broken at the joint part, resulting in a durability problem.

The present invention has been made to solve the above problems and has a purpose to provide a delivery pipe capable of reducing pulsation of fuel pressure without adding a pulsation damper and preventing damage of a joint part with a straight part to achieve improved durability.

Solution to Problem

To achieve the above purpose, one aspect of the invention provides a delivery pipe made of resin and internally formed with a fuel passage, wherein the delivery pipe has a shape of cross section including at least a straight part and a joint part formed as a joint with an end of the straight part, the joint part having a protruding outer appearance.

Advantageous Effects of Invention

According to the present invention, it is possible to restrain or reduce pulsation of fuel pressure without adding a pulsation damper and prevent damage of a joint part with a straight part to achieve improved durability.

DESCRIPTION OF EMBODIMENTS

DESCRIPTION OF EMBODIMENTS

First Embodiment

A detailed description of a first embodiment of a delivery pipe embodying the present invention will now be given referring to the accompanying drawings.

Figure 1:
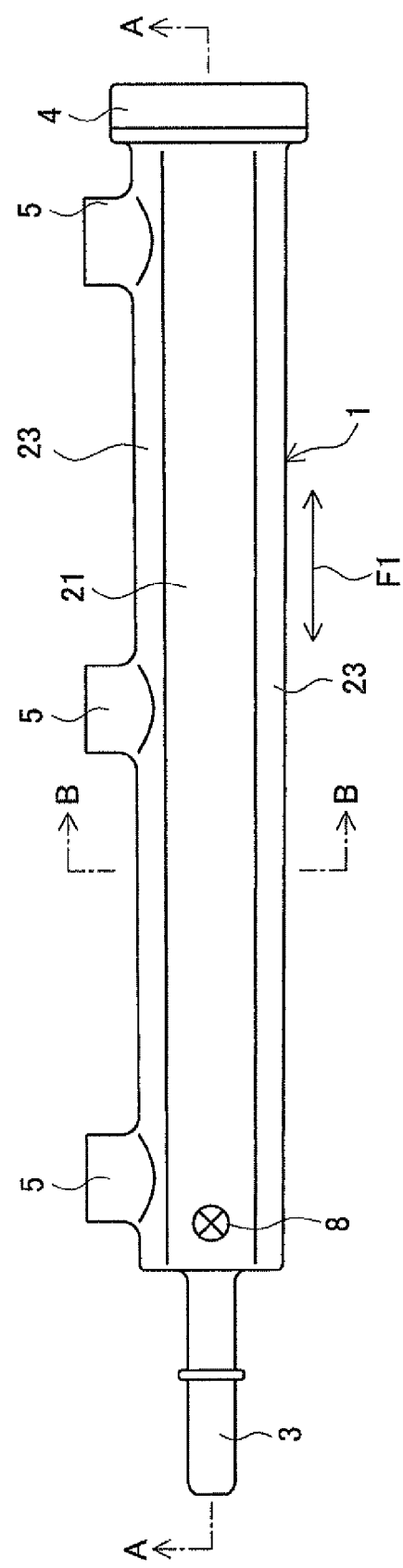
FIG. 1 is a plan view of a delivery pipe in a first embodiment.
Figure 2:
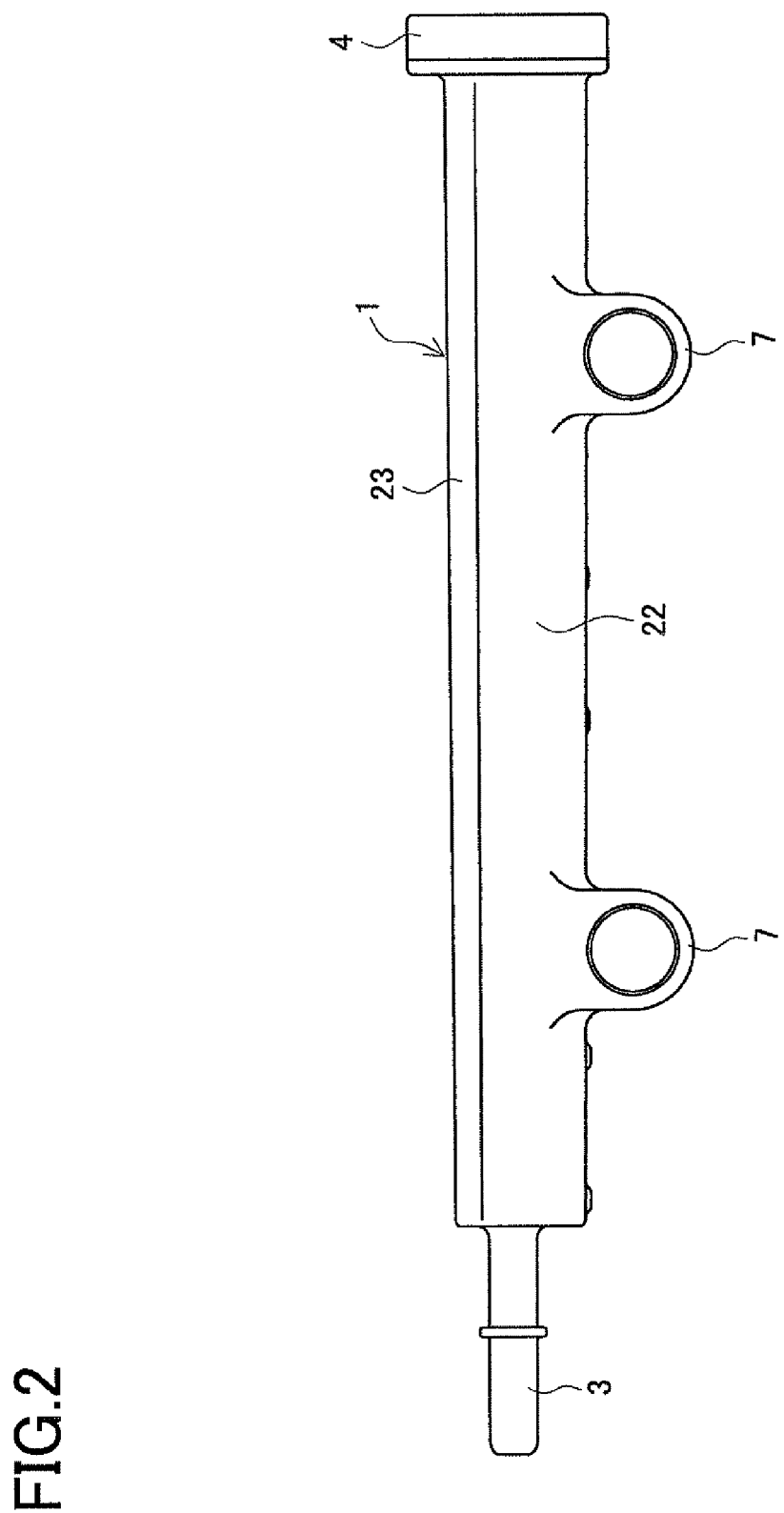
FIG. 2 is a back view of the delivery pipe in the first embodiment.
Figure 3:
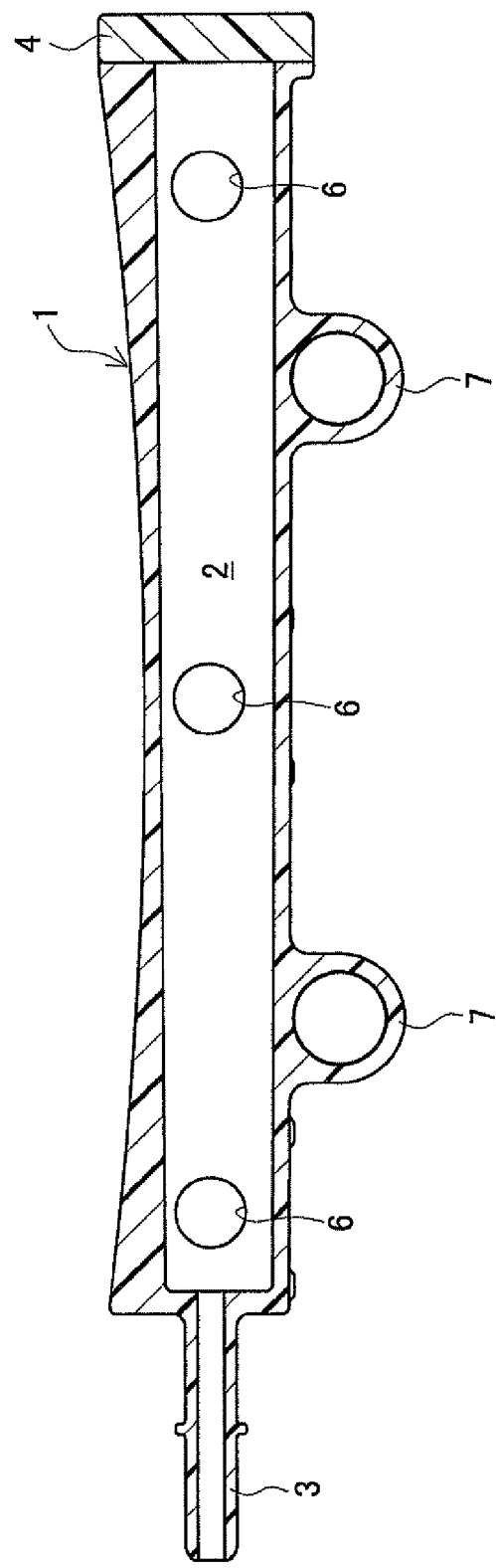
FIG. 3 is a cross sectional view of the delivery pipe taken along a line A-A in FIG. 1 in the first embodiment.
Figure 4:
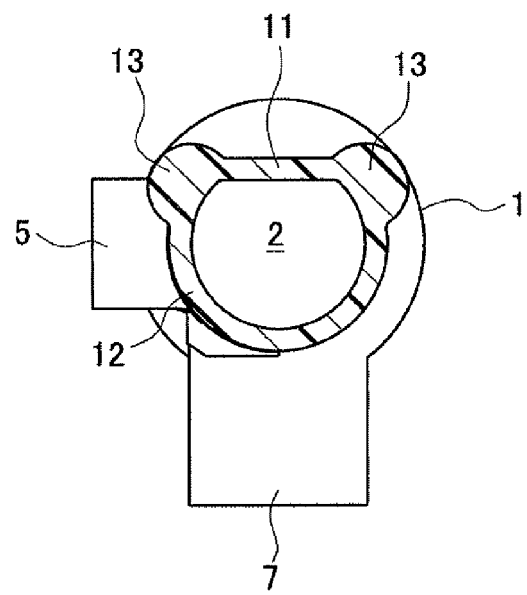
FIG. 4 is a cross sectional view of the delivery pipe taken along a line B-B in FIG. 1 in the first embodiment.

FIG. 1 is a plan view of a delivery pipe 1 in the first embodiment. FIG. 2 is a back view of the delivery pipe 1. FIG. 3 is a cross sectional view of the delivery pipe 1 taken along a line A-A in FIG. 1. FIG. 4 is a cross sectional view of the delivery pipe 1 taken along a line B-B in FIG. 1.

As shown in FIGS. 1 to 3, the delivery pipe 1 is made of resin in an almost cylindrical elongated shape internally formed with a fuel passage 2. The delivery pipe 1 has an end integrally formed with a pipe joint 3 to be connected to a fuel pipe and the other end to which a cap 4 is welded. The delivery pipe 1 is also integrally formed, on its front side (an upper side in FIG. 1), with a plurality of sockets 5 (three sockets in this embodiment) arranged at intervals in a longitudinal direction of the delivery pipe 1. Each socket 5 has an almost cylindrical shape having a mounting hole 6. Each socket 5 is adapted for attachment of an injector. The delivery pipe 1 is further integrally formed, on its lower side, with a plurality of brackets 7 (two brackets in this embodiment) arranged at intervals in the longitudinal direction of the delivery pipe 1. Each bracket 7 is used for fixing the delivery pipe 1 to an engine with bolts and others.

As shown in FIG. 4, the delivery pipe 1 has a shape of cross section including a single straight part 11, a single curved part 12, and two joint parts 13 at the joints between one ends of the straight part 11 and the curved part 12 and between the other ends of the straight part 11 and the curved part 12. In this embodiment, the straight part 11 is formed in an opposite position to the brackets 7. Each of the two joint parts 13 has an outer appearance protruding outward in a semicircular shape in cross section and a wall thickness thicker than the wall thickness the straight part 11 and the curved part 12. Since the delivery pipe 1 has a long shape, when viewed in three dimensions, the straight part 11 forms a flat plate portion 21 extending along the longitudinal direction of the delivery pipe 1 as shown in FIG. 1. Similarly, when viewed in three dimensions, the curved part 12 forms a curved plate portion 22 extending along the longitudinal direction of the delivery pipe 1 as shown in FIG. 2. Further, when viewed in three dimensions, each of the two joint parts 13 also forms a protruding portion 23 extending along the longitudinal direction of the delivery pipe 1 as shown in FIGS. 1 and 2.

As shown in FIG. 1, in the straight part 11 (the flat plate portion 21) of the delivery pipe 1 and at one end region of the fuel passage 2 in the longitudinal direction, a gate corresponding portion (a "gate mark") 8 is left in correspondence to a resin injection gate provided in a mold used for resin molding of this delivery pipe 1. In the present embodiment, a resin material forming the delivery pipe 1 and the cap 4 is nylon resin such as "PA66" and "PPA". Further, to enhance strength of the delivery pipe 1 and flexibility of the straight part 11 (the flat plate portion 21), the nylon resin contains reinforcing glass fibers. In the present embodiment, the gate mark 8 is located on the straight part 11 (the flat plate portion 21) and at one end region of the fuel passage 2 in its longitudinal direction. While resin is injected into a mold through a resin injection gate, the reinforcing glass fibers will flow along the longitudinal direction of the flat plate portion 21 win the nylon resin. As a result, the orientation of the reinforcing glass fibers is directed to the longitudinal direction of the flat plate portion 21, that is, in an arrow F1 in FIG. 2.

In the present embodiment, furthermore, a capacity VD of the delivery pipe 1 is set to a required capacity to restrain the pulsation amplitude of fuel pressure in the delivery pipe 1 to a predetermined value or less. The reason why the pulsation amplitude is set to be the predetermined value or less is to reduce sound occurring in the delivery pipe 1 due to the pulsation of fuel pressure to such a low level that the sound is not perceived as vehicle interior noise. In the present embodiment, the capacity VD ($cm^3$) is set to meet the following condition (I) based on a relationship with an engine displacement VE ($cm^3$) per cylinder.

$$VD \geq 108 * \ln\{(VE+150)/2.5\} - 544 \quad (I)$$

The delivery pipe 1 in the present embodiment explained as above is made of resin to have the shape of cross section including at least the single straight part 11 (the single flat plate portion 21). Accordingly, the straight part 11 (the flat plate portion 21) is flexible and will be deflected or deformed by the pulsation of fuel pressure, thereby absorbing that pulsation. The delivery pipe 1 can thus restrain or reduce the pulsation of fuel pressure without especially including the pulsation damper. This can stabilize the fuel injection amount from each injector to stably control the air-fuel ratio of the engine, ensuring engine performance and preventing the occurrence of noise from the delivery pipe 1.

Figure 5:
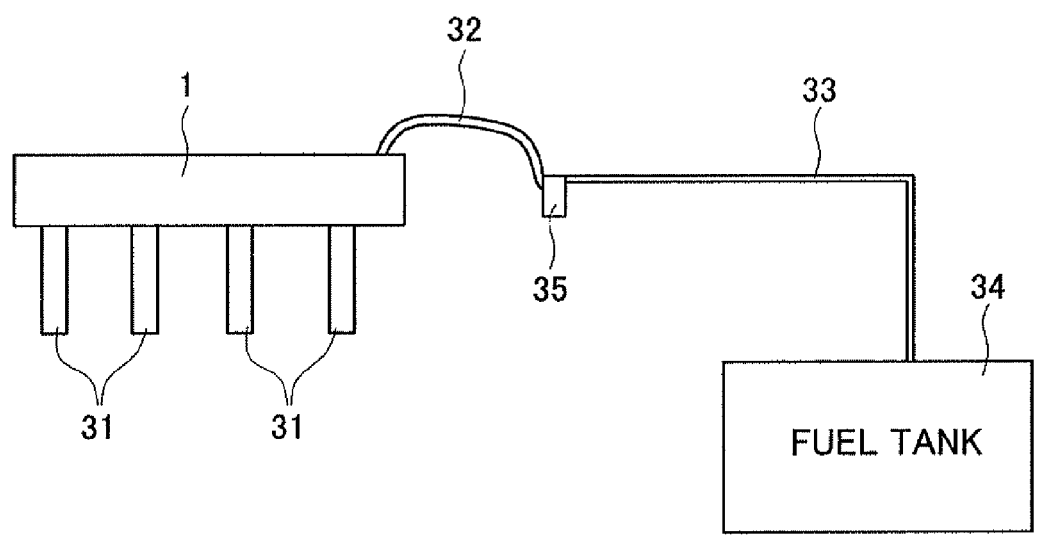
FIG. 5 is a schematic view showing a pulsation measuring method in the first embodiment.

Herein, an explanation is given to comparison of fuel pressure pulsation restraining effect between the delivery pipe 1 in the present embodiment and a conventional delivery pipe (a comparative example). FIG. 5 is a schematic view showing a pulsation measuring method. As shown in FIG. 5, four injectors 31 are attached to the delivery pipe 1. The delivery pipe 1 is supplied with fuel from a fuel tank 34 through a hose 32 and an iron pipe 33. In the fuel tank 34, a fuel pump (not shown) is provided for pressure feeding fuel. A pressure sensor 35 for measuring fuel pressure is provided between the hose 32 and the iron pipe 33. While fuel is pressure-fed from the fuel tank 34 to the delivery pipe 1 and injected through each injector 31, the behavior of fuel pressure is measured by the pressure sensor 35.

Figure 6:
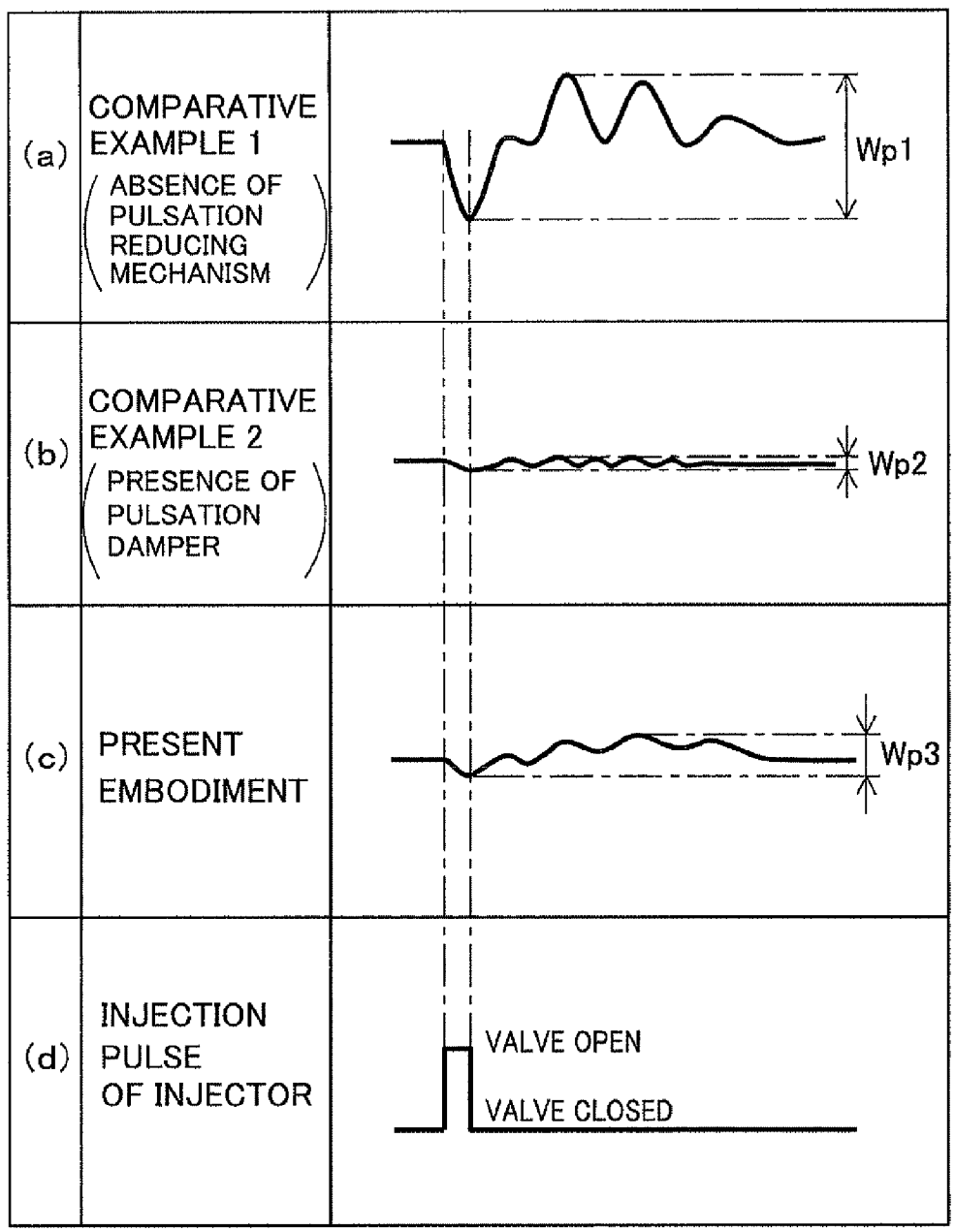
FIG. 6 is a time chart showing pulsation measurement results for comparison in the first embodiment.

FIG. 6 is a time chart showing pulsation measurement results of the present embodiment and comparative examples 1 and 2. FIG. 6 (a) shows a pulsation waveform of fuel pressure in "Comparative example 1" using a delivery pipe having no pulsation restraining mechanism. FIG. 6 (b) shows a pulsation waveform of fuel pressure in "Comparative example 2" using a delivery pipe having a pulsation damper. FIG. 6 (c) shows a pulsation waveform of fuel pressure in the case using the delivery pipe 1 in the present embodiment. FIG. 6 (d) shows an injection pulse of each injector 31. As seen from this time charts, when fuel is injected from each injector 31 by an amount for one injection, the fuel pressure firstly decreases once and pulsation starts, and then the pulsation converges with time. A pulsation amplitude Wp1 in Comparative example 1 is relatively large, while a pulsation amplitude Wp2 in Comparative example 2 and a pulsation amplitude Wp3 in the present embodiment are relatively small. The pulsation amplitude Wp3 in the present embodiment is slightly larger than pulsation amplitude Wp2 in Comparative example 2 but is smaller to about one-third of the pulsation amplitude Wp1 in Comparative example 1. The pulsation amplitude Wp2 in Comparative example 2 and the pulsation amplitude Wp3 in the present embodiment are both at a level not disturbing stabilization of engine air-fuel ratio control and noise reducing effect. Accordingly, the delivery pipe 1 in the present embodiment can effectively restrain or reduce pulsation of fuel pressure as with the delivery pipe having a pulsation damper.

In the delivery pipe 1 in the present embodiment, furthermore, the outer appearance of each joint part 13 (each protruding portion 23) between the straight part 11 (the flat plate portion 21) and the curved part 12 (the curved plate portion 22) is formed to protrude outward. Stress concentration on each joint part 13 (each protruding portion 23) is relaxed when the straight part 11 (the flat plate portion 21) is deflected or deformed under the fuel pressure. This makes it possible to prevent breakage of the joint parts 13 (the protruding portions 23) and hence improve durability of the delivery pipe 1.

Figures 7, 8:
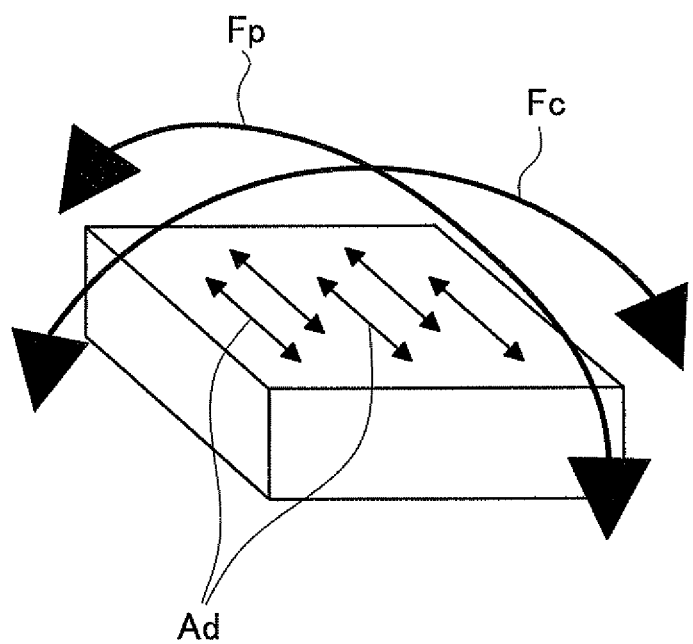
FIG. 7 is a schematic diagram showing a relationship between orientation of reinforcing glass fibers in a straight part and bending direction of the straight part in the first embodiment.
FIG. 8 is a table showing differences between elasticity coefficient and deflection ratio with respect to the bending direction in the first embodiment.

Furthermore, according to the delivery pipe 1 in the present embodiment, when resin is injected in a mold through a resin injection gate for molding, the reinforcing glass fibers flow together with resin in a longitudinal direction of the flat plate portion 21, so that the orientation of the reinforcing glass fibers is directed to the longitudinal direction of the flat plate portion 21, i.e., a direction indicated by an arrow F1 in FIG. 1. Therefore, an easily bending direction of the straight part 11 (the flat plate portion 21) of the delivery pipe 1 is a direction indicated by an arrow Fc in FIG. 7 perpendicular to the orientation Ad of the reinforcing glass fibers, rather than a direction indicated by an arrow Fp in FIG. 7 parallel with the orientation Ad of reinforcing glass fibers. FIG. 7 is a schematic diagram showing a relationship between the orientation Ad of reinforcing glass fibers in the straight part 11 (the flat plate portion 21) and bending directions of the straight part 11 (the flat plate portion 21). FIG. 8 is a table showing differences in elasticity coefficient (MPa) and a deflection ratio between different bending directions. From this table, it is found that the elasticity coefficient in the "Perpendicular (Fc)" bending direction is smaller than that in the "Parallel (Fp)" bending direction but the deflection amount ratio in the "Perpendicular (Fc)" bending direction is larger than that in the "Parallel (Fp)" bending direction. This result reveals that the straight part 11 (the flat plate portion 21) is easier to bend in the "Perpendicular (Fc)" direction. Thus, an allowable deflection amount of the straight part 11 (the flat plate portion 21) can be increased, thereby allowing a larger change in capacity of the delivery pipe 1 and achieving improved pulsation restraining effect of fuel pressure.

Figure 9:
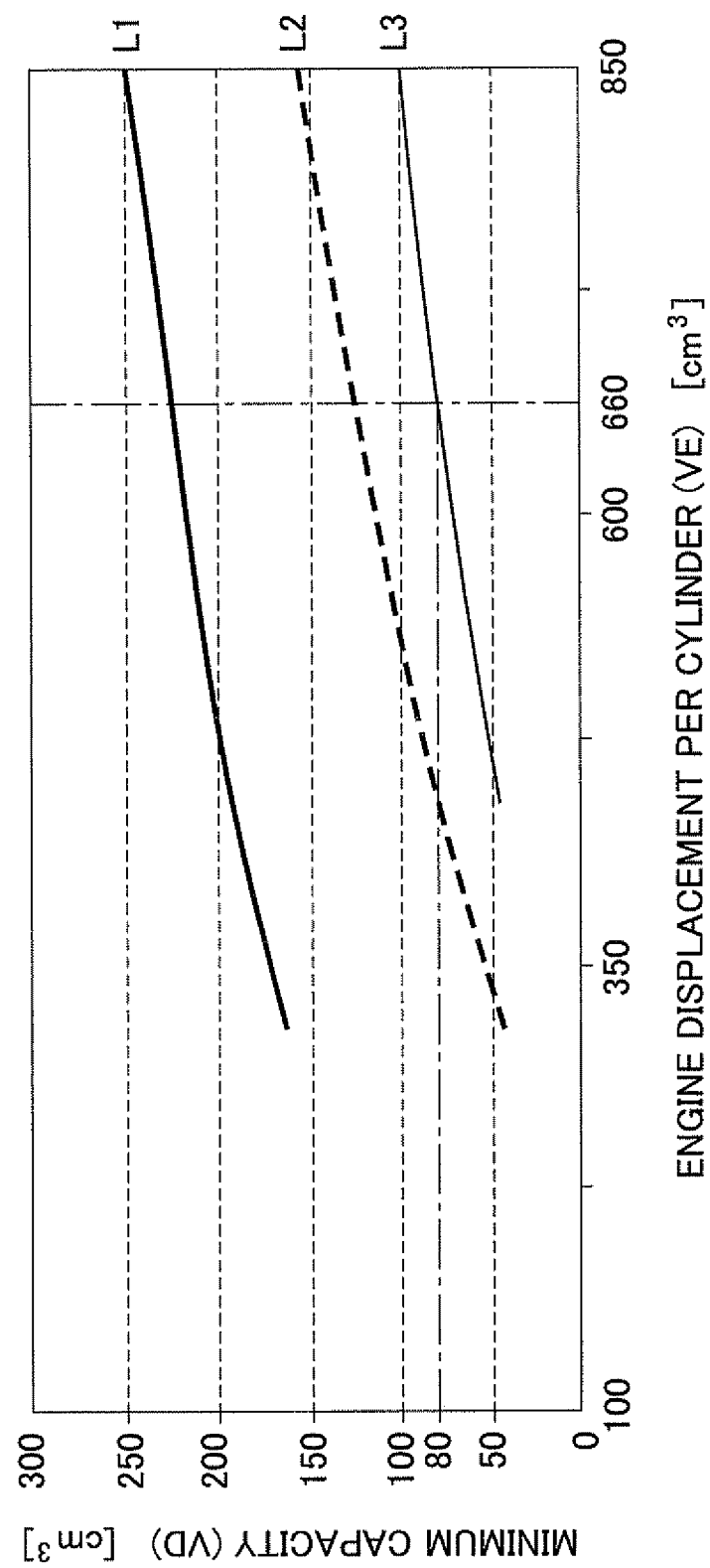
FIG. 9 is a graph showing a relationship between engine displacement per cylinder and minimum capacity of a delivery pipe in the first embodiment.

In the delivery pipe 1 in the present embodiment, furthermore, the capacity of the delivery pipe 1 is set under the condition of the above expression (I). Accordingly, a required capacity capable of reducing the pulsation amplitude of fuel pressure to a predetermined value or less when the delivery pipe 1 is adopted in an engine with general engine displacement can be reduced down to "80 $(cm^3)$". FIG. 9 is a graph showing a relationship between engine displacement per cylinder of an engine adopting the delivery pipe and a minimum capacity of a delivery pipe required to restrain or reduce the pulsation amplitude of fuel pressure in the delivery pipe to the predetermined value or less. In FIG. 9, curved lines L1, L2, and L3 represent characteristics curves of various delivery pipes. Herein, the curved line L1 relates to an aluminum delivery pipe having a circular cross section (having no straight part). The curved line L2 relates to a resin delivery pipe having a circular cross section (having no straight part). The curved line L3 relates to a resin delivery pipe 1 in the present embodiment that meets the condition represented by the above expression (I). As is clear from FIG. 9, when a maximum value of engine displacement (VE) per cylinder in various engines is assumed to be "about 660 $(cm^3)$", the minimum capacity (VD) of the delivery pipe 1 can be reduced to "80 $(cm^3)$", which is the smallest as compared with other curved lines L1 and L2. As above, the delivery pipe 1 in the present embodiment can achieve size reduction while ensuring the pulsation restraining effect of fuel pressure. In this case, the size of the delivery pipe 1 in its longitudinal direction depends on engine type in which the delivery pipe 1 is to be adopted. Thus, enabling reduction in the capacity of the delivery pipe 1 can make the delivery pipe 1 thinner.

Second Embodiment

A second embodiment of a delivery pipe embodying the present invention will be explained in detail below referring to the accompanying drawings.

It is to be noted that identical components to those in the first embodiment are given the same reference signs and their details are not explained herein. The following explanation is made with a focus on differences from the first embodiment.

Figure 10:
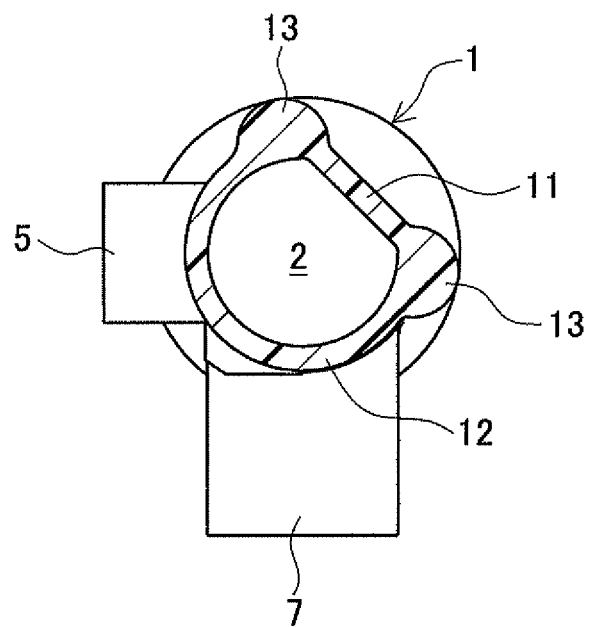
FIG. 10 is a cross sectional view of a delivery pipe in a second embodiment.

FIG. 10 is a cross sectional view of a delivery pipe 1 in the second embodiment. This cross sectional view conforms to that in FIG. 4. The second embodiment is a modified example of the first embodiment and different from the first embodiment in that a straight part 11 (a flat plate portion 21) is located obliquely in a position displaced slightly upward from a back side opposite sockets 5. Hence, a curved part 12 (a curved plate portion 22) and joint parts 13 (protruding portions 23) are different in position from those in the first embodiment.

This delivery pipe 1 in the second embodiment can also provide similar operations and advantages as those in the first embodiment.

Third Embodiment

A third embodiment of a delivery pipe embodying the present invention will be explained in detail below referring to the accompanying drawings.

Figure 11:
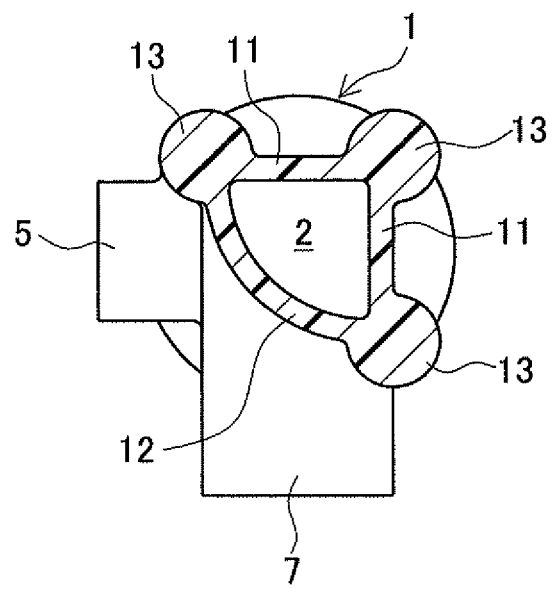
FIG. 11 is a cross sectional view of a delivery pipe in a third embodiment.

FIG. 11 is a cross sectional view, conforming to FIG. 4, of a delivery pipe 1 in the third embodiment. The delivery pipe 1 in this embodiment has a shape of cross section including two straight parts 11 (two flat plate portions 21) arranged perpendicular to each other, a single curved part 12 (a curved plate portion 22), and three joint parts 13 (three protruding portions 23) at joints between one ends of the straight parts 11 (the flat plate portions 21) and ends of the curved part 12 (the curved plate portion 22) and at a joint between the other ends of the straight parts 11 (the flat plate portions 21). In the third embodiment, one of the straight parts 11 (the flat plate portions 21) is located in a position opposite sockets 5, that is on a back side of the delivery pipe 1, and the other straight part 11 (the flat plate portion 21) is located on an upper side. Each joint part 13 has an almost circular cross section and a thicker wall thickness than other portions (the straight parts 11 and the curved part 12). The above configurations are different from each of the aforementioned embodiments.

Accordingly, the delivery pipe 1 in the third embodiment can also provide similar operations and advantages as in the first embodiment. In the third embodiment, additionally, the delivery pipe 1 includes the two straight parts 11 (the flat plate portions 21). This configuration allows a larger change in capacity of the delivery pipe 1 than another configuration including a single straight part 11 (a single flat plate portion 21). The pulsation restraining effect of fuel pressure can be increased by just that much.

Fourth Embodiment

A fourth embodiment of a delivery pipe embodying the present invention will be explained in detail below referring to the accompanying drawings.

Figure 12:
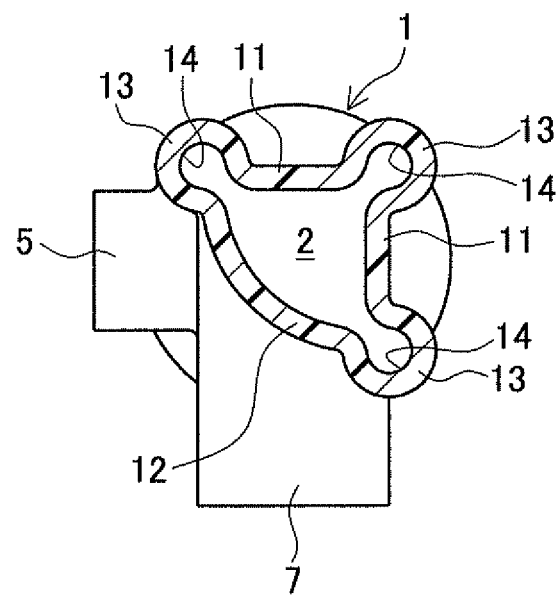
FIG. 12 is a cross sectional view of a delivery pipe in a fourth embodiment.

FIG. 12 is a cross sectional view, conforming to FIG. 4, of a delivery pipe 1 in the fourth embodiment. This embodiment differs from the third embodiment in that each joint part 13 (each protruding portion 23) having a protruding outer appearance is internally formed with a recess 14. Each recess 14 has an almost circular cross section along the outer shape of the corresponding joint part 13 (protruding portion 23) so that each joint part 13 is equal in wall thickness to straight parts 11 and a curved part 12.

Accordingly, the delivery pipe 1 in the fourth embodiment can also provide similar operations and advantages as in the third embodiment. In this embodiment, additionally, the joint parts 13 (the protruding portions 23) are internally formed with the recesses 14 respectively, so that a circumferential length of the internal surface of each joint part 13 (each protruding portion 23) increases, thus further reducing stress concentration. In this regard, it is possible to prevent breakage of each joint part 13 (each protruding portion 23) and further improve durability of the delivery pipe 1. In the fourth embodiment, the presence of the recesses 14 can increase the capacity of a fuel passage 2 without increasing the volume of the delivery pipe 1.

Fifth Embodiment

A fifth embodiment of a delivery pipe embodying the present invention will be explained in detail below referring to the accompanying drawings.

Figure 13:
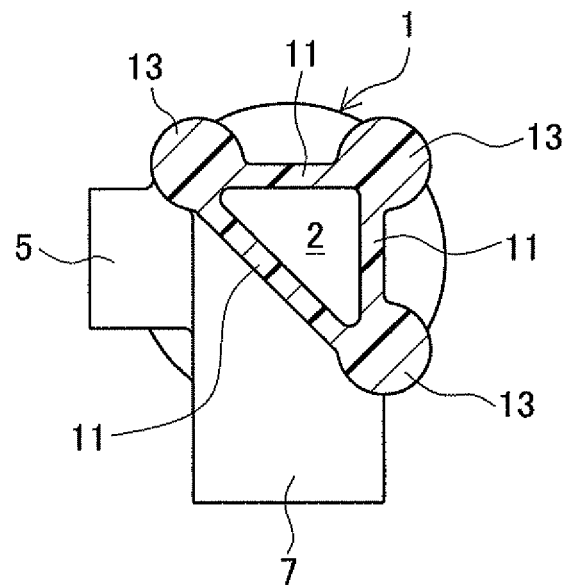
FIG. 13 is a cross sectional view of a delivery pipe in a fifth embodiment.

FIG. 13 is a cross sectional view, conforming to FIG. 4, of a delivery pipe 1 in the fifth embodiment. This embodiment differs from the third embodiment in that the curved part 12 (the curved plate portion 22) of the third embodiment is replaced with a straight part 11 (a flat plate portion 21). Specifically, in the fifth embodiment, the shape of cross section of the delivery pipe 1 includes three straight parts 11 (three flat plate portions 21) and three joint parts 13 (three protruding portions 23) at joints between the straight parts 11 (the flat plate portions 21). Further, two of the three straight parts 11 (the flat plate portions 21) are located perpendicular to each other. The straight parts 11 (the flat plate portions 21) are formed to be equal in wall thickness. Each joint part 13 (each protruding portion 23) is formed to have an almost circular cross section and a wall thickness larger than the wall thickness of each straight part 11 (each flat plate portion 21).

Consequently, the delivery pipe 1 in the fifth embodiment can also provide similar operations and advantages as those in the third embodiment. Additionally, this embodiment includes three straight parts 11 (three flat plate portions 21) and thus allows a larger change in capacity of the delivery pipe 1 than another configuration including two straight parts 11 (two flat plate portions 21). The pulsation restraining effect of fuel pressure can be increased by just that much.

Sixth Embodiment

A sixth embodiment of a delivery pipe embodying the present invention will be explained in detail below referring to the accompanying drawings.

Figure 14:
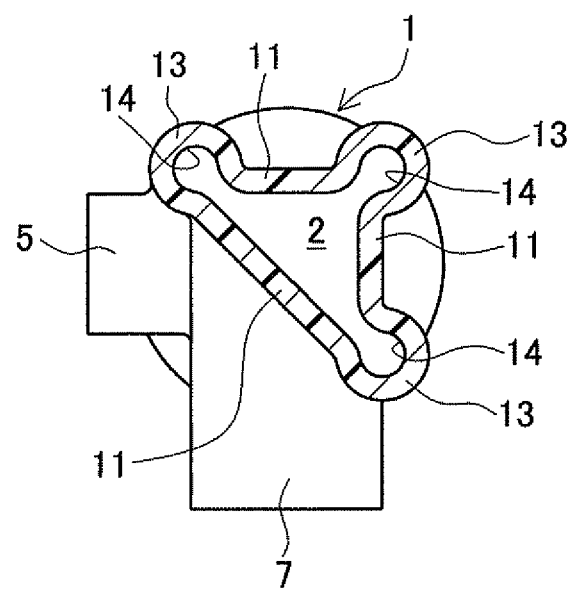
FIG. 14 is a cross sectional view of a delivery pipe in a sixth embodiment.

FIG. 14 is a cross sectional view, conforming to FIG. 4, of a delivery pipe 1 in the sixth embodiment. This embodiment differs from the fourth embodiment in that the curved part 12 (the curved plate portion 22) of the fourth embodiment is replaced with a straight part 11 (a flat plate portion 21). Specifically, in the sixth embodiment, a shape of cross section of the delivery pipe 1 includes three straight parts 11 (three flat plate portions 21) and three joint parts 13 (three protruding portions 23) at joints between the straight parts 11 (the flat plate portions 21). Further, two of the three straight parts 11 (the flat plate portions 21) are located perpendicular to each other, and each joint part 13 (each protruding portion 23) having a protruding outer appearance is internally formed with a recess 14. Each joint part 13 (each protruding portion 23) is equal in wall thickness to the wall thickness of each straight part 11 (each flat plate portion 21).

Consequently, the delivery pipe 1 in the sixth embodiment can also provide similar operations and advantages as those in the fourth embodiment. Additionally, this embodiment includes three straight parts 11 (three flat plate portions 21) and thus allows a larger change in capacity of the delivery pipe 1 than another configuration including two straight parts 11 (two flat plate portions 21). The pulsation restraining effect of fuel pressure can be increased by just that much.

Seventh Embodiment

A seventh embodiment of a delivery pipe embodying the present invention will be explained in detail below referring to the accompanying drawings.

Figure 15:
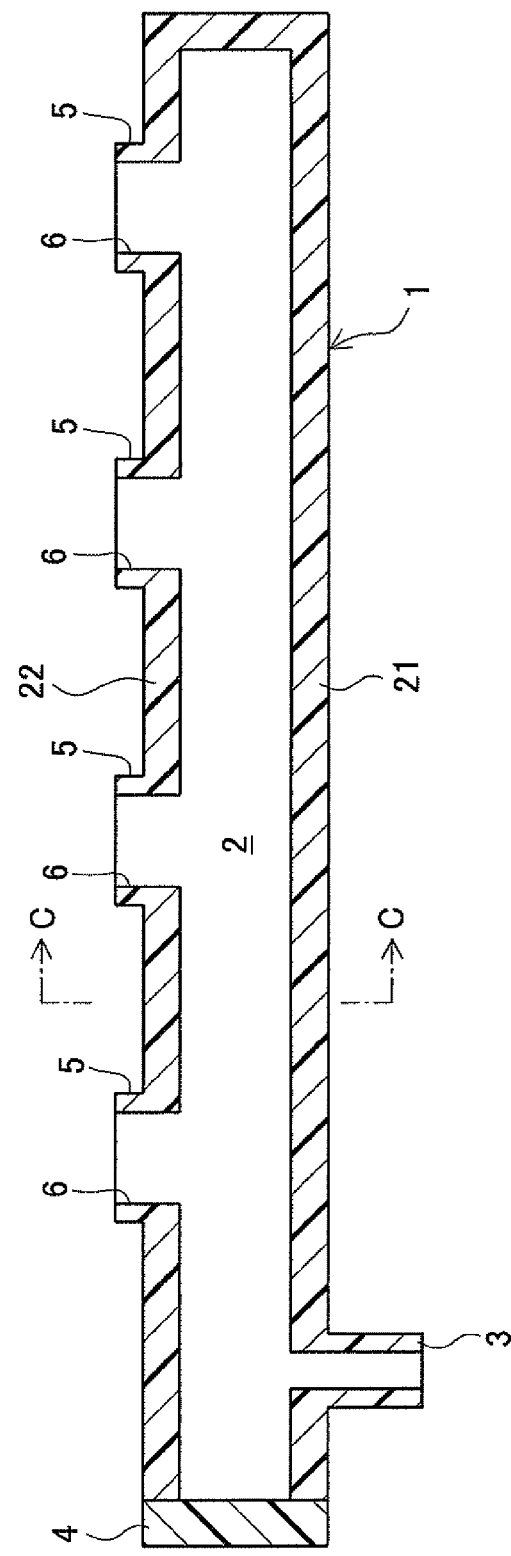
FIG. 15 is a planar sectional view of a delivery pipe in a seventh embodiment.
Figure 16:
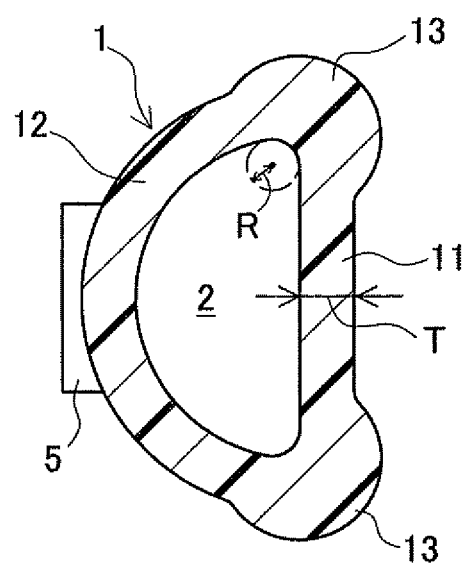
FIG. 16 is a cross sectional view of the delivery pipe taken along a line C-C in FIG. 15 in the seventh embodiment.

FIG. 15 is a planar cross sectional view of a delivery pipe in the seventh embodiment. FIG. 16 is a cross sectional view of the delivery pipe 1 taken along a line C-C in FIG. 15. As shown in FIG. 15, this delivery pipe 1 is mold of resin in an almost cylindrical elongated shape internally formed with a fuel passage 2. The delivery pipe 1 has an end integrally formed with a pipe joint 3 to be connected to a fuel pipe and the other end to which a cap 4 is welded. The delivery pipe 1 is also integrally formed, on its front side (an upper side in FIG. 15), with a plurality of sockets 5 (four sockets in this embodiment) arranged at intervals in a longitudinal direction of the delivery pipe 1. Each socket 5 has a mounting hole 6.

Figure 17:
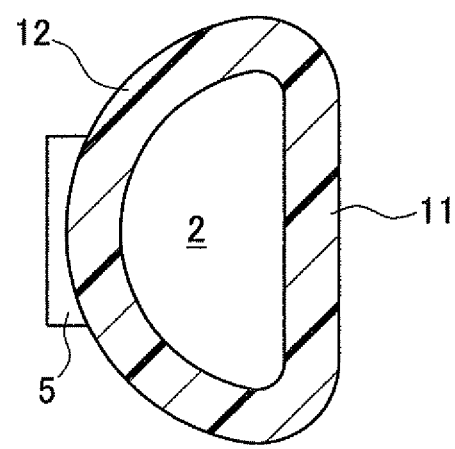
FIG. 17 is a cross sectional view of a delivery pipe in a comparative example with that in FIG. 16 in the seventh embodiment.

As shown in FIG. 16, the delivery pipe 1 has an almost semicircular cross section including a single straight part 11, a single curved part 12, and joint parts 13 at joints between one ends of straight part 11 and the curved part 12 and between the other ends of the straight part 11 and the curved part 12. In this embodiment, the straight part 11 is located in a position opposite the sockets 5, that is, on the back side. Each of the two joint parts 13 has an outer appearance protruding in a semicircular shape in cross section and a wall thickness thicker than the wall thickness of the straight part 11 and the curved part 12. Since the delivery pipe 1 has a long shape, when viewed in three dimensions, the straight part 11 forms a flat plate portion 21 extending in the longitudinal direction of the delivery pipe 1. Similarly, when viewed in three dimensions, the curved part 12 forms a curved plate portion 22 extending in the longitudinal direction of the delivery pipe 1. Further, when viewed in three dimensions, each of the two joint parts 13 forms a protruding portion 23 extending in the longitudinal direction of the delivery pipe 1. FIG. 17 is a cross sectional view showing a comparative example in which a joint part 13 at a joint between the straight part 11 and the curved part 12 has an outer appearance not protruding outward.

Figure 18:
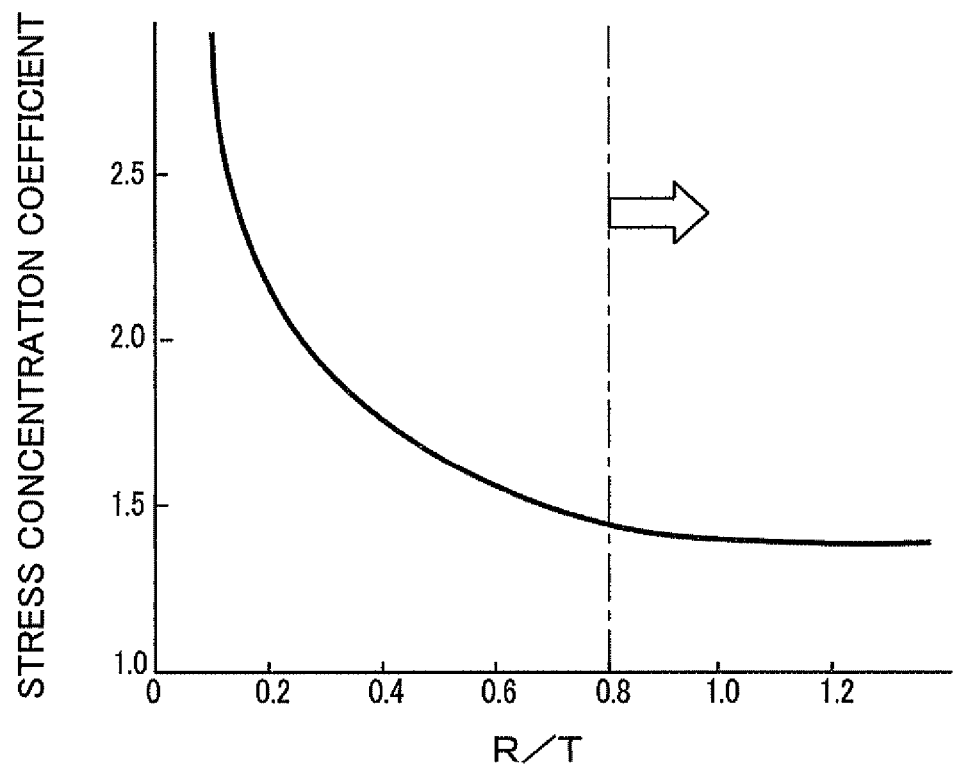
FIG. 18 is a graph showing a relationship between "R/T" and stress concentration coefficient in the seventh embodiment.

It is found that, in the seventh embodiment, when the wall thickness T of the straight part 11 (the flat plate portion 21) and the inside radius R of each joint part 13 (each protruding portion 23) are determined to have a predetermined relationship in FIG. 16, stress concentration on each joint part 13 (each protruding portion 23) could be restrained. Specifically, when a ratio of the radius R to the wall thickness T; "R/T", is set to a large value, it is possible to prevent stress concentration on each joint part 13 (each protruding portion 23). For instance, when the wall thickness T is constant, stress on each joint part 13 (each protruding portion 23) decreases as the radius R is set larger. FIG. 18 is a graph showing a relationship of the ratio "R/T" to a stress concentration coefficient. In this graph, when the stress concentration coefficient is desired to be 1.5 or less, the ratio "R/T" has to be set to 0.8 or more. Accordingly, when the thickness T is constant at 2.5, the radius R has to be set to 2.0 or more in order to achieve a stress concentration coefficient of 1.5 or less.

The delivery pipe 1 in the seventh embodiment explained above can provide similar operations and advantages as those in the first embodiment. In addition, in this embodiment, the wall thickness T of the straight part 11 (the flat plate portion 21) and the inside radius R of each joint part 13 (each protruding portion 23) are set in the predetermined relationship as explained above. This can reliably reduce the stress concentration on each joint part 13 (each protruding portion 23) in accordance with the wall thickness T of the straight part 11 (the flat plate portion 21).

Eighth Embodiment

An eighth embodiment of a delivery pipe embodying the present invention will be explained in detail below referring to the accompanying drawings.

Figure 19:
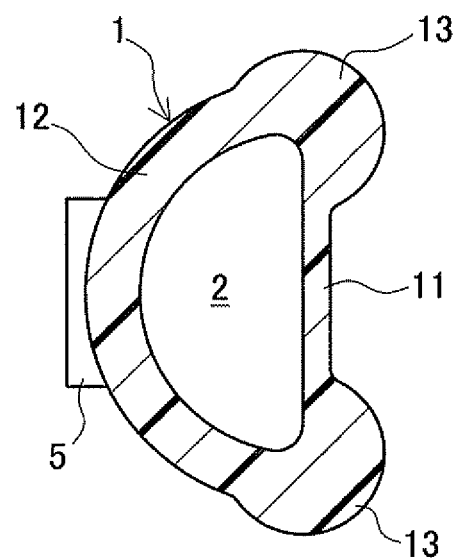
FIG. 19 is a cross sectional view of a delivery pipe in an eighth embodiment.

FIG. 19 is a cross sectional view, conforming to FIG. 16, of a delivery pipe 1 in the eighth embodiment. This embodiment differs from the seventh embodiment in that a straight part 11 (a flat plate portion 21) is formed thinner than a curved part 12 (a curved plate portion 22). In this embodiment, specifically, the delivery pipe 1 has a shape of cross section including a single straight part 11 (a single flat plate portion 21), a single curved part 12 (a single curved plate portion 22), and two joint parts 13 (two protruding portions 23) at joints between one ends of the straight part 11 (the flat plate portion 21) and the curved part 12 (the curved plate portion 22) and between the other ends of the straight part 11 (the flat plate portion 21) and the curved part 12 (the curved plate portion 22). The straight part 11 (the flat plate portion 21) is formed thinner than the curved part 12 (the curved plate portion 22).

Accordingly, the delivery pipe 1 in the eighth embodiment can also provide similar operations and advantages as those in the seventh embodiment. In addition, in the eighth embodiment, the straight part 11 (the flat plate portion 21) is formed thinner than the curved part 12 (the curved plate portion 22), so that the straight part 11 (the flat plate portion 21) is more flexible than in the seventh embodiment. This configuration allows a larger change in capacity of the delivery pipe 1 than that in the seventh embodiment. Thus, the pulsation restraining effect of fuel pressure can be increased by just that much.

Ninth Embodiment

A ninth embodiment of a delivery pipe embodying the present invention will be explained in detail below referring to the accompanying drawings.

Figure 20:
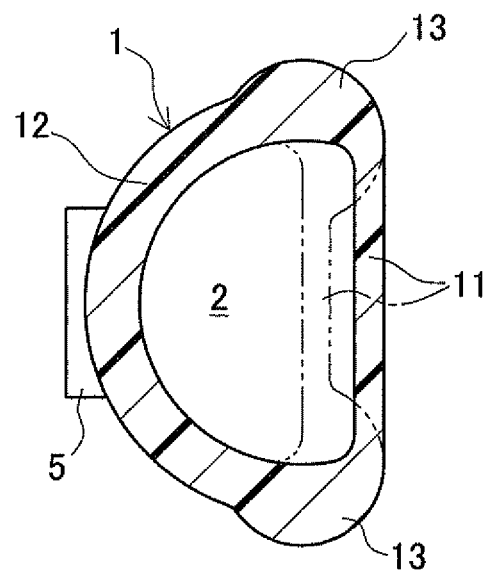
FIG. 20 is a cross sectional view of a delivery pipe in a ninth embodiment.

FIG. 20 is a cross sectional view, conforming to FIG. 16, of a delivery pipe 1 in the ninth embodiment. This embodiment differs from the eighth embodiment in that a straight part 11 (a flat plate portion 21) is formed to be more outside than the straight part 11 (the flat plate portion 21) of the eighth embodiment indicated by a chain double-dashed line in FIG. 20, that is, on the outer side of the joint parts 13 (the protruding portions 23) having an outer appearance protruding outward, as indicated by a solid line in FIG. 20. In the ninth embodiment, specifically, each joint part 13 (each protruding portion 23) is formed to have an outer appearance protruding outward in a semicircular shape in cross section. The straight part 11 (the flat plate portion 21) is formed on the outer side of the joint parts 13 (the protruding portions 23) so that the outer surface of the straight part 11 (the flat plate portion 21) is tangent in a cross section to, or flush with, the outer periphery of the joint parts 13 (the protruding portions 23).

Accordingly, the ninth embodiment can also provide similar operations and advantages as those in the eighth embodiment. In addition, in this embodiment, the straight part 11 (the flat plate portion 21) is formed to be thinner than the curved part 12 (the curved plate portion 22) and to be located on the outer side of the joint parts 13 (the protruding portions 23). Thus, the delivery pipe 1 can have an increased capacity of the fuel passage 2 without increasing an outer appearance (size). This can achieve a compact delivery pipe 1 while ensuring the capacity of the fuel passage 2.

Tenth Embodiment

A tenth embodiment of a delivery pipe embodying the present invention will be explained in detail below referring to the accompanying drawings.

Figure 21:
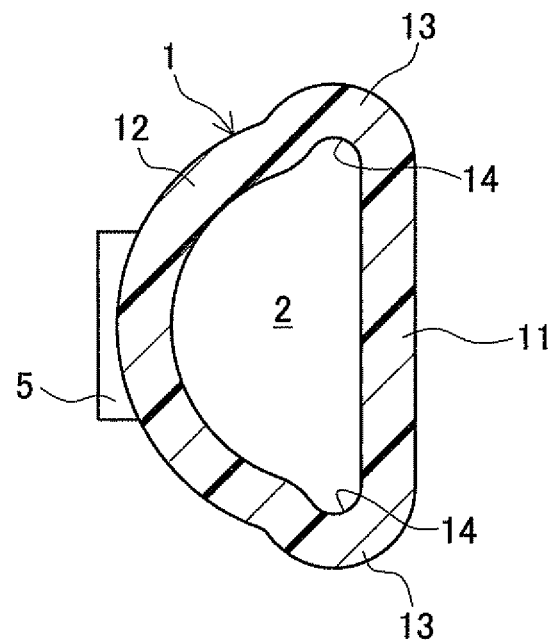
FIG. 21 is a cross sectional view of a delivery pipe in a tenth embodiment.

FIG. 21 is a cross sectional view, conforming to FIG. 16, of a delivery pipe 1 in the tenth embodiment. This embodiment differs from the seventh embodiment in that a recess 14 is formed in each joint part 13 (each protruding portion 23) having an outer appearance protruding outward. The recesses 14 are curved along the outer shape of the joint parts 13 (the protruding portions 23) so that the wall thickness of each joint part 13 (each protruding portion 23) is equal to those of the straight part 11 (the flat plate portion 21) and the curved part 12 (the curved plate portion 22).

The delivery pipe 1 in the ninth embodiment can also provide similar operations and advantages as those in the seventh embodiment. In the ninth embodiment, additionally, the recesses 14 are individually formed inside of the joint parts 13 (the protruding portions 23), thus providing an increased circumferential length of the internal surface of each joint part 13 (each protruding portion 23). This configuration can further reduce stress concentration. In this regard, it is possible to prevent breakage of each joint part 13 (each protruding portion 23) and further improve durability of the delivery pipe 1. In the ninth embodiment, the presence of the recesses 14 can increase the capacity of the fuel passage 2 by just that much without increasing the volume of the delivery pipe 1.

Eleventh Embodiment

An eleventh embodiment of a delivery pipe embodying the present invention will be explained in detail below referring to the accompanying drawings.

Figure 22:
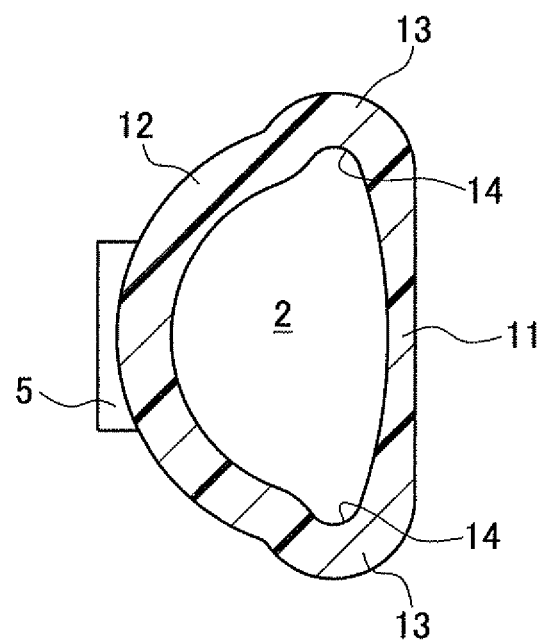
FIG. 22 is a cross sectional view of a delivery pipe in an eleventh embodiment.

FIG. 22 is a cross sectional view, conforming to FIG. 16, of a delivery pipe 1 in the eleventh embodiment. This embodiment differs from the tenth embodiment in that a straight part 11 (a flat plate portion 21) is formed with a wall thickness that is thinner than a curved part 12 (a curved plate portion 22) and gradually decreases from each joint part 13 (each protruding portion 23) to a middle portion of the straight part 11. In the eleventh embodiment, the delivery pipe 1 has a shape of cross section including the single straight part 11 (the single flat plate portion 21), the single curved part 12 (the single curved plate portion 22), and the two joint parts 13 (the two protruding portions 23) at joints between one ends of the straight part 11 (the flat plate portion 21) and the curved part 12 (the curved plate portion 22) and between the other ends of the straight part 11 (the flat plate portion 21) and the curved part 12 (the curved plate portion 22). Further, the curved part 12 (the curved plate portion 22) is formed with a uniform thickness and the straight part 11 (the flat plate portion 21) is formed with the wall thickness that is gradually thinner from the joint parts 13 (the protruding portions 23) to the middle portion.

Accordingly, the delivery pipe 1 in the eleventh embodiment can also provide similar operations and advantages as those in the tenth embodiment. In the eleventh embodiment, additionally, the straight part 11 (the flat plate portion 21) has the wall thickness that is gradually thinner from the joint parts 13 (the protruding portions 23) to the middle portion, so that the straight part 11 (the flat plate portion 21) can be more flexible than in the tenth embodiment. This configuration allows a larger change in capacity of the delivery pipe 1 than that in the tenth embodiment. Thus, the pulsation restraining effect of fuel pressure can be increased by just that much.

Twelfth Embodiment

A twelfth embodiment of a delivery pipe embodying the present invention will be explained in detail below referring to the accompanying drawings.

Figure 23:
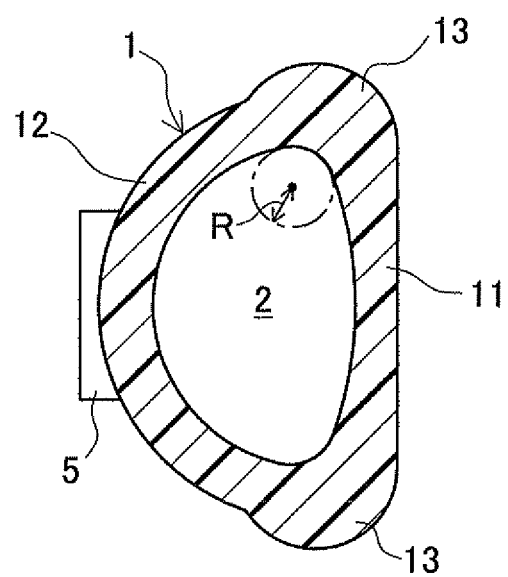
FIG. 23 is a cross sectional view of a delivery pipe in a twelfth embodiment.

FIG. 23 is a cross sectional view, conforming to FIG. 16, of a delivery pipe 1 in the twelfth embodiment. This embodiment differs from the seventh embodiment in that an inside radius R of each joint part 13 (each protruding portion 23) is larger than that in the seventh embodiment and a straight part 11 (a flat plate portion 21) has a wall thickness that is thinner than the curved part 12 (the curved plate portion 22) and gradually decreases from each joint part 13 (each protruding portion 23) to a middle portion of the straight part 11.

Accordingly, the delivery pipe 1 of the twelfth embodiment can also provide similar operations and advantages as those in the seventh embodiment. In the twelfth embodiment, additionally, the inside radius R of each joint part 13 (each protruding portion 23) is relatively set large, so that a stress concentration coefficient is relatively small based on the aforementioned relationship at "R/T". This makes it possible to relatively reduce the stress concentration on the joint parts 13 (the protruding portions 23). Further, since the straight part 11 (the flat plate portion 21) is formed to be gradually thinner from the joint parts 13 (the protruding portions 23) to the middle portion, the straight part 11 (the flat plate portion 21) is more flexible than in the seventh embodiment. This configuration allows a larger change in capacity of the delivery pipe 1 than that in the seventh embodiment. Thus, the pulsation restraining effect of fuel pressure can be increased by just that much.

The present invention is not limited to the aforementioned embodiments and may be embodied in other specific forms without departing from the essential characteristics thereof.

For instance, the number of sockets and the number of brackets provided in each delivery pipe may be appropriately increased or decreased, and the shape of cross section of each delivery pipe may be appropriately changed.

While the presently preferred embodiment of the present invention has been shown and described, it is to be understood that this disclosure is for the purpose of illustration and that various changes and modifications may be made without departing from the scope of the invention as set forth in the appended claims.

INDUSTRIAL APPLICABILITY

The present invention is utilizable in a fuel supply apparatus of an engine.

REFERENCE SIGNS LIST

1 Delivery pipe
2 Fuel passage
8 Gate corresponding portion (Gate mark)
11 Straight part
12 Curved part
13 Joint part
14 Recess

The invention claimed is:

1. A delivery pipe made of resin and internally formed with a fuel passage, the delivery pipe having a shape of cross section including:
   at least one straight part;
   a curved part or another straight part; and
   at least one joint part formed as a joint between (1) an end of the curved part or the another straight part and (2) an end of the at least one straight part, wherein:
   the at least one joint part has a protruding outer appearance,
   the at least one straight part forms a flat plate portion extending in a longitudinal direction of the fuel passage,
   the curved part forms a curved plate portion extending in the longitudinal direction of the fuel passage, and
   the at least one joint part forms a protruding portion extending in the longitudinal direction of the fuel passage.

2. The delivery pipe according to claim 1, wherein the at least one joint part having the protruding outer appearance is internally formed with a recess.

3. The delivery pipe according to claim 1, wherein the shape of cross section includes the curved part, and the at least one straight part is thinner in wall thickness than the curved part.

4. The delivery pipe according to claim 1, wherein the outer appearance of the at least one joint part is formed to protrude outward in a semicircular shape in cross section, and the at least one straight part is formed on an outer side of the at least one joint part so that an outer surface of the at least one straight part is tangent to an outer periphery of the at least one joint part in cross section.

5. The delivery pipe according to claim 2, wherein the outer appearance of the at least one joint part is formed to protrude outward in a semicircular shape in cross section, and the at least one straight part is formed on an outer side of the at least one joint part so that an outer surface of the at least one straight part is tangent to an outer periphery of the at least one joint part in cross section.

6. The delivery pipe according to claim 1, wherein the resin contains reinforcing glass fibers, and the at least one straight part includes a portion corresponding to a resin injection gate at an end region of the fuel passage in the longitudinal direction.

7. The delivery pipe according to claim 2, wherein the resin contains reinforcing glass fibers, and the at least one straight part includes a portion corresponding to a resin injection gate at an end region of the fuel passage in the longitudinal direction.

8. The delivery pipe according to claim 1, wherein the delivery pipe has a capacity (VD (cm$^3$)) set to meet the following expression (I) based on a relationship with engine displacement (VE (cm$^3$)) per cylinder:

$$VD \geq 108 * ln\{(VE+150)/2.5\} - 544 \tag{I}$$

9. The delivery pipe according to claim 7, wherein the delivery pipe has a capacity (VD (cm$^3$)) set to meet the following expression (I) based on a relationship with engine displacement (VE (cm$^3$)) per cylinder:

$$VD \geq 108 * ln\{(VE+150)/2.5\} - 544 \tag{I}$$

10. The delivery pipe according to claim 1, wherein
the shape of cross section includes a single said straight part, a single said curved part, and two said joint parts at joints between ends of the straight part and the curved part and between the other ends of the straight part and the curved part, the straight part is equal in wall thickness to the curved part, each of the joint parts has an outer appearance protruding outward in a semicircular shape in cross section, and each joint part is thicker than the straight part and the curved part.

11. The delivery pipe according to claim 10, wherein each joint part has a circular-arc internal surface having an inside radius (R) determined so that a ratio (R/T) of the inside radius (R) to a thickness (T) of the straight part is a predetermined value.

12. The delivery pipe according to claim 1, wherein the shape of cross section includes a single said straight part, a single said curved part, and two said joint parts at joints between ends of the straight part and the curved part and between the other ends of the straight part and the curved part, and the straight part is thinner in wall thickness than the curved part.

13. The delivery pipe according to claim 12, wherein each of the two joint parts has an outer appearance protruding outward in a semicircular shape in cross section, and the straight part is formed on an outer side of each of the joint parts so that an outer surface of the straight part is tangent to an outer periphery of each of the joint parts in cross section.

14. The delivery pipe according to claim 1, wherein the shape of cross section includes a single said straight part, a single said curved part, and two said joint parts at joints between ends of the straight part and the curved part and between the other ends of the straight part and the curved part, the curved part has a uniform thickness, and the straight part has a wall thickness that is gradually thinner from the joint parts to a middle portion of the straight part.

15. The delivery pipe according to claim 1, wherein the shape of cross section includes two said straight parts orthogonal to each other, a single said curved part, and three said joint parts at joints between ends of the straight parts and ends of the curved part and between the other ends of the straight parts, the straight parts are equal in wall thickness to the curved part, each of the joint parts has an almost circular cross section and is thicker in wall thickness than the straight parts and the curved part.

16. The delivery pipe according to claim 1, wherein the shape of cross section includes two said straight parts perpendicular to each other, a single said curved part, and three said joint parts at joints between ends of the straight parts and ends of the curved part and between the other ends of the straight parts, each of the joint parts having the protruding outer appearance is internally formed with a recess, and each joint part is equal in wall thickness to the straight parts and the curved part.

17. The delivery pipe according to claim 1, wherein the shape of cross section includes three said straight parts and three said joint parts at joints between ends of the straight parts, two of the three straight parts are perpendicular to each other, the straight parts are equal in wall thickness to one another, each of the joint parts has an almost circular cross section and is thicker in wall thickness than the straight parts.

18. The delivery pipe according to claim 1, wherein the shape of cross section includes three said straight parts and three said joint parts at joints between ends of the straight parts, two of the three straight parts are perpendicular to each other, each of the joint parts having an outer appearance protruding outward is internally formed with a recess, each joint part is equal in wall thickness to the straight parts.

19. The delivery pipe according to claim 1, wherein an inner surface of the flat plate portion facing the fuel passage forms a plane that is substantially parallel to a plane formed by an outer surface of the flat plate portion that is opposite the inner surface.

\* \* \* \* \*